(12) United States Patent
Foncubierta Rodriguez et al.

(10) Patent No.: US 11,062,133 B2
(45) Date of Patent: Jul. 13, 2021

(54) DATA STRUCTURE GENERATION FOR TABULAR INFORMATION IN SCANNED IMAGES

(71) Applicant: International Business Machines Corporation, Armonk, NY (US)

(72) Inventors: Antonio Foncubierta Rodriguez, Zurich (CH); Maria Gabrani, Thalwil (CH); Waleed Farrukh, Munich (DE)

(73) Assignee: International Business Machines Corporation, Armonk, NY (US)

( * ) Notice: Subject to any disclaimer, the term of this patent is extended or adjusted under 35 U.S.C. 154(b) by 53 days.

(21) Appl. No.: 16/450,078

(22) Filed: Jun. 24, 2019

(65) Prior Publication Data

US 2020/0401798 A1 Dec. 24, 2020

(51) Int. Cl.
*G06K 9/00* (2006.01)
*G06T 7/70* (2017.01)
(Continued)

(52) U.S. Cl.
CPC ..... *G06K 9/00449* (2013.01); *G06F 16/2246* (2019.01); *G06F 16/51* (2019.01);
(Continued)

(58) Field of Classification Search
CPC ...... G06K 9/6255; G06K 9/66; G06K 9/6216; G06K 9/00228; G06K 9/4609; G06K 9/48; G06K 9/469; G06T 11/60; G06T 11/001; G06T 7/0083; G06T 5/006; G06T 5/20; G06T 2207/10016; G06T 7/70; G06F 17/30249
See application file for complete search history.

(56) References Cited

U.S. PATENT DOCUMENTS 6,061,515 A * 5/2000 Chang .................. G06F 16/289
717/114
6,421,658 B1 * 7/2002 Carey .................. G06F 16/284
(Continued)

OTHER PUBLICATIONS

Jahan, Mac, A. "Locating Tables in Scanned Documents for Reconstructing and Republishing", 7th International Conference on Information and Automation for Sustainability, Dec. 2014, 6 pages.
(Continued)

*Primary Examiner* — Amir Alavi
(74) *Attorney, Agent, or Firm* — Scully, Scott, Murphy & Presser, P.C.; Daniel P. Morris

(57) ABSTRACT

Computer-implemented methods are provided for generating a data structure representing tabular information in a scanned image. Such a method can include storing image data representing a scanned image of a table, processing the image data to identify positions of characters and lines in the image, and mapping locations in the image of information cells, each containing a set of the characters, in dependence on said positions. The method can also include, for each cell, determining cell attribute values, dependent on the cell locations, for a predefined set of cell attributes, and supplying the attribute values as inputs to a machine-learning model trained to pre-classify cells as header cells or data cells in dependence on cell attribute values.

20 Claims, 12 Drawing Sheets

(51) Int. Cl.
*G06K 9/46* (2006.01)
*G06F 16/22* (2019.01)
*G06N 5/02* (2006.01)
*G06N 20/20* (2019.01)
*G06F 16/51* (2019.01)
*G06F 40/137* (2020.01)
*G06F 40/258* (2020.01)

(52) U.S. Cl.
CPC .......... *G06F 40/137* (2020.01); *G06F 40/258* (2020.01); *G06K 9/00456* (2013.01); *G06K 9/469* (2013.01); *G06N 5/025* (2013.01); *G06N 20/20* (2019.01); *G06T 7/70* (2017.01); *G06T 2207/20072* (2013.01); *G06T 2207/20081* (2013.01); *G06T 2207/30176* (2013.01)

(56) References Cited

U.S. PATENT DOCUMENTS

| | | | | |
|---|---|---|---|---|
| 7,103,613 | B2* | 9/2006 | Nouri | G06F 16/289 |
| 7,590,486 | B2* | 9/2009 | Okude | G01C 21/32 |
| | | | | 340/539.2 |
| 7,630,993 | B2* | 12/2009 | Adler | G06F 16/86 |
| 7,716,167 | B2* | 5/2010 | Colossi | G06F 16/283 |
| | | | | 707/714 |
| 8,645,421 | B2* | 2/2014 | Meric | G06Q 10/00 |
| | | | | 707/778 |
| 8,725,660 | B2* | 5/2014 | Forman | G06F 16/355 |
| | | | | 706/12 |
| 9,767,151 | B2* | 9/2017 | Mindnich | G06F 16/24544 |
| 10,176,245 | B2* | 1/2019 | Lim | G06F 16/285 |
| 10,360,208 | B2* | 7/2019 | Lupp | G06F 16/185 |
| 2011/0249905 | A1 | 10/2011 | Singh et al. | |
| 2015/0093021 | A1 | 4/2015 | Xu et al. | |
| 2016/0004682 | A1* | 1/2016 | Nakatsuka | G06F 3/04842 |
| | | | | 715/228 |
| 2016/0055376 | A1 | 2/2016 | Koduru | |
| 2016/0117551 | A1 | 4/2016 | Hausmann et al. | |

OTHER PUBLICATIONS

Constantin, A., et al., "PDFX: Fully-automated PDF-to-XML Conversion of Scientific Literature", DocEng '13, Sep. 10-13, 2013, pp. 177-180.

Chen J., et al. "Information Extraction from Resume Documents in PDF Format", IS&T International Symposium on Electronic Imaging 2016 Document Recognition and Retrieval XXIII, Feb. 17, 2016, 8 pages.

Fang, J., et al., "A Table Detection Method for Multipage PDF Documents via Visual Separators and Tabular Structures", 2011 International Conference on Document Analysis and Recognition, ICDAR 2011, Sep. 18-21, 2011, pp. 779-783.

Hassan, T., et al., "Table Recognition and Understanding from PDF Files", Ninth International Conference on Document Analysis and Recognition, ICDAR 2007, Oct. 2007, 5 pages, vol. 2.

Green, E.A., et al., "Model-based Analysis of Printed Tables", Proceedings of the Third International Conference on Document Analysis and Recognition, Jan. 1995, 13 pages, vol. 1.

Astrakhantsev, N., et al., "Semi-automatic Data Extraction from Tables", Proceedings of the 15th All-Russian Conference "Digital Libraries: Advanced Methods and Technologies, Digital Collections" RCDL-2013, Oct. 14-18, 2013, pp. 14-20.

Deivalakshmi, S., et al., "Detection of Table Structure and Content Extraction From Scanned Documents", International Conference on Communication and Signal Processing, Apr. 3-5, 2014, pp. 270-274.

Gobel, M., et al., "A Methodology for Evaluating Algorithms for Table Understanding in PDF Documents", DocEng 12, Sep. 4-7, 2012, 4 pages.

Wang, X., "Tabular Abstraction, Editing, and Formatting", PhD thesis, Waterloo, Ontario, Canada, 1996, 200 pages.

Richardson, M., et al., "Markov logic networks", Mach. Learn (2006)., Received Aug. 11, 2004, Revised Jan. 31, 2005, Accepted Jul. 5, 2006, Published online Jan. 27, 2006, pp. 107-136, vol. 62.

Misa, T.J., "An Interview with Edsger W. Dijkstra", Communications of the ACM, Aug. 2010, pp. 41-47, vol. 53, No. 8.

* cited by examiner

|  | GNP per capita (x1000$) | population (millions) | retail outlets (x1000) |
|---|---|---|---|
| France | 27.5 | 81.9 | 415.3 |
| Germany | 25.0 | 58.1 | 343.4 |
| UK | 18.7 | 58.6 | 289.9 |
| Spain | 19.0 | 57.3 | 627.2 |
| Italy | 13.6 | 39.3 | 440.2 |
| Netherlands | 24.0 | 15.4 | 123.3 |

Figure 2a

| Category | Claim rate | | | | |
|---|---|---|---|---|---|
| | 2000 | | 2015 | | |
| | Estimate | Margin of error (±) | Estimate | Margin of error (±) | Difference |
| All people | 18.6 | 0.3 | 18.1 | 0.3 | *−0.5 |
| Female | 17.9 | 0.4 | 17.6 | 0.4 | −0.3 |
| Male | 19.0 | 0.3 | 18.3 | 0.4 | *−0.7 |
| Age 20-40 | 18.1 | 0.3 | 17.7 | 0.3 | *−0.5 |
| Over 30 | 16.9 | 0.4 | 16.1 | 0.4 | −0.4 |
| Age 40-60 | 23.6 | 0.7 | 23.6 | 0.7 | −1.0 |
| Over 50 | 20.9 | 0.7 | 20.9 | 0.7 | *−1.0 |
| Over 60 | 14.5 | 1.3 | 14.5 | 1.1 | — |

Figure 2b

| source | Year | | | |
|---|---|---|---|---|
| | 2005/6 | 2006/7 | 2007/8 | 2008/9 |
| | Enrolment (x1000) | | | |
| Actual | 49,293 | 49,266 | 49,373 | 49,484 |
| | Projected enrolment(x1000) | | | |
| projection to 2010 | 49,644 | 49,828 | 50,067 | 50,353 |
| projection to 2011 | 49,470 | 49,623 | 49,788 | 50,034 |
| projection to 2012 | † | 49,265 | 49,312 | 49,366 |
| projection to 2013 | † | † | 49,283 | 49,306 |
| | Difference actual/projected (%) | | | |
| projection to 2010 | 0.7 | 1.1 | 1.4 | 1.8 |
| projection to 2011 | 0.4 | 0.7 | 0.8 | 1.1 |
| projection to 2012 | † | ‡ | −0.1 | −0.2 |
| projection to 2013 | † | † | −0.2 | −0.4 |

Figure 2c

All Lines

|  | Roads | | | Bridges | | |
|---|---|---|---|---|---|---|
|  | concrete | asphalt | stone | metal | cable | wood |
| London | 111 | 112 | 113 | 121 | 122 | 123 |
| Zurich | 211 | 212 | 213 | 221 | 222 | 223 |
| N.York | 311 | 312 | 313 | 321 | 322 | 323 |
| Berlin | 411 | 412 | 413 | 421 | 422 | 423 |
| Moscow | 511 | 512 | 513 | 521 | 522 | 523 |
| Paris | 611 | 612 | 613 | 621 | 622 | 623 |
| Karachi | 711 | 712 | 713 | 721 | 722 | 723 |
| Beijing | 811 | 812 | 813 | 821 | 822 | 823 |
| Lahore | 911 | 912 | 913 | 921 | 922 | 923 |
| Istanbul | 1011 | 1012 | 1013 | 1021 | 1022 | 1023 |

Figure 2d

Some Lines

|  | Roads | | | Bridges | | |
|---|---|---|---|---|---|---|
|  | concrete | asphalt | stone | metal | cable | wood |
| London | 111 | 112 | 113 | 121 | 122 | 123 |
| Zurich | 211 | 212 | 213 | 221 | 222 | 223 |
| N.York | 311 | 312 | 313 | 321 | 322 | 323 |
| Berlin | 411 | 412 | 413 | 421 | 422 | 423 |
| Moscow | 511 | 512 | 513 | 521 | 522 | 523 |
| Paris | 611 | 612 | 613 | 621 | 622 | 623 |
| Karachi | 711 | 712 | 713 | 721 | 722 | 723 |
| Beijing | 811 | 812 | 813 | 821 | 822 | 823 |
| Lahore | 911 | 912 | 913 | 921 | 922 | 923 |
| Istanbul | 1011 | 1012 | 1013 | 1021 | 1022 | 1023 |

Figure 2e

Some Lines

|  | Roads | | | Bridges | | |
|---|---|---|---|---|---|---|
|  | concrete | asphalt | stone | metal | cable | wood |
| London | 111 | 112 | 113 | 121 | 122 | 123 |
| Zurich | 211 | 212 | 213 | 221 | 222 | 223 |
| N.York | 311 | 312 | 313 | 321 | 322 | 323 |
| Berlin | 411 | 412 | 413 | 421 | 422 | 423 |
| Moscow | 511 | 512 | 513 | 521 | 522 | 523 |
| Paris | 611 | 612 | 613 | 621 | 622 | 623 |
| Karachi | 711 | 712 | 713 | 721 | 722 | 723 |
| Beijing | 811 | 812 | 813 | 821 | 822 | 823 |
| Lahore | 911 | 912 | 913 | 921 | 922 | 923 |
| Istanbul | 1011 | 1012 | 1013 | 1021 | 1022 | 1023 |

Figure 2f

No Lines

|  | Roads | | | Bridges | | |
|---|---|---|---|---|---|---|
|  | concrete | asphalt | stone | metal | cable | wood |
| London | 111 | 112 | 113 | 121 | 122 | 123 |
| Zurich | 211 | 212 | 213 | 221 | 222 | 223 |
| N.York | 311 | 312 | 313 | 321 | 322 | 323 |
| Berlin | 411 | 412 | 413 | 421 | 422 | 423 |
| Moscow | 511 | 512 | 513 | 521 | 522 | 523 |
| Paris | 611 | 612 | 613 | 621 | 622 | 623 |
| Karachi | 711 | 712 | 713 | 721 | 722 | 723 |
| Beijing | 811 | 812 | 813 | 821 | 822 | 823 |
| Lahore | 911 | 912 | 913 | 921 | 922 | 923 |
| Istanbul | 1011 | 1012 | 1013 | 1021 | 1022 | 1023 |

Figure 2g

Characters:

Figure 6a

☐ character

Horizontal lines:

Figure 6b

Vertical lines:

Figure 6c

Characters:
Figure 7a
Morphological dilation/lines:
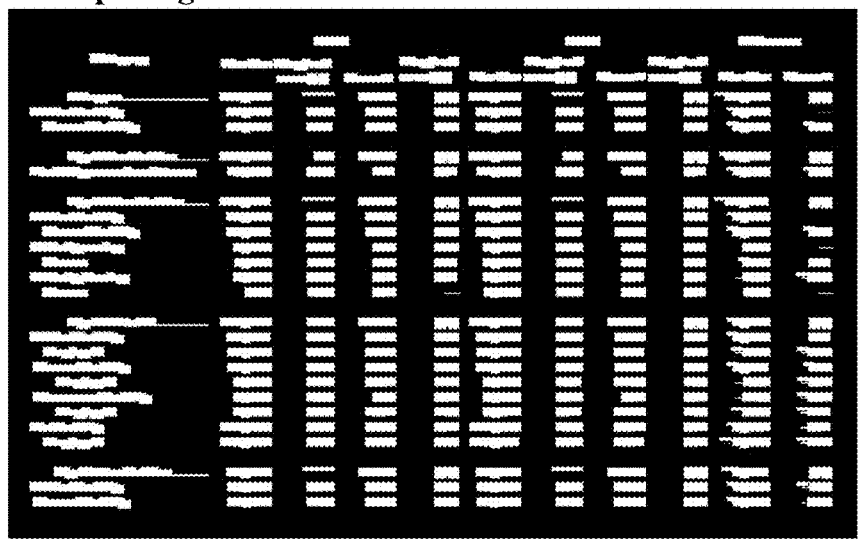
Figure 7b
Cells:
Figure 7c
 cell

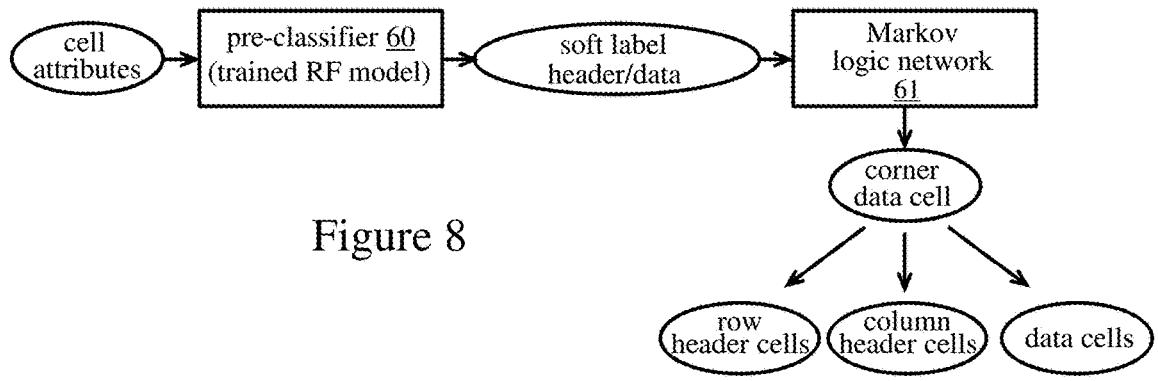

| Predicates | Explanation |
|---|---|
| *IsData(cell)* | Output from the pre-classifier |
| *IsHeader(cell)* | Output from the pre-classifier |
| *Above(cell,cell_below)* | True for all cells above cell_below |
| *Below(cell,cell_above)* | True for all cells below cell_above |
| *Right(cell,cell_left)* | True for all cells right of cell_left |
| *Left(cell,cell_right)* | True for all cells left of cell_right |
| *SameRow(cell,cell2)* | True for all cells that belong to same row as cell2 |
| *SameCol(cell,cell2)* | True for all cells that belong to same column as cell2 |
| Query | Explanation |
| *CornerDataCell* | The cell that defines transition between header and data |

Figure 9a

| | Roads | | | Bridges | | |
|---|---|---|---|---|---|---|
| | concrete | asphalt | stone | metal | cable | wood |
| London | 111 | 112 | 113 | 121 | 122 | 123 |
| Zurich | 211 | 212 | 213 | 221 | 222 | 223 |
| N.York | 311 | 312 | 313 | 321 | 322 | 323 |
| Berlin | 411 | 412 | 413 | 421 | 422 | 423 |
| Moscow | 511 | 512 | 513 | 521 | 522 | 523 |
| Paris | 611 | 612 | 613 | 621 | 622 | 623 |
| Karachi | 711 | 712 | 713 | 721 | 722 | 723 |
| Beijing | 811 | 812 | 813 | 821 | 822 | 823 |
| Lahore | 911 | 912 | 913 | 921 | 922 | 923 |
| Istanbul | 1011 | 1012 | 1013 | 1021 | 1022 | 1023 |

(corner data cell → 111)

Figure 9b

| Rule | First-order logic |
|---|---|
| 1 | $Above(cell, cell\_below) \land IsData(cell\_below) \land Below(cell, cell\_above) \land IsHeader(cell\_above)$ $\Rightarrow DataTransitionCorner(cell)$ |
| 2 | $Left(cell, cell\_right) \land IsData(cell\_right) \land Right(cell, cell\_left) \land IsHeader(cell\_right)$ $\Rightarrow DataTransitionCorner(cell)$ |
| 3 | $Below(cell, cell\_above) \land IsData(cell\_above) \Rightarrow \neg DataTransitionCorner(cell)$ |
| 4 | $Right(cell, cell\_left) \land IsData(cell\_left) \Rightarrow \neg DataTransitionCorner(cell)$ |
| 5 | $SameCol(cell, cell2) \land \neg Below(cell, cell2) \land IsHeader(cell2) \Rightarrow \neg DataTransitionCorner(cell)$ |
| 6 | $SameRow(cell, cell2) \land \neg Right(cell, cell2) \land IsHeader(cell2) \Rightarrow \neg DataTransitionCorner(cell)$ |
| 7 | $DataTransitionCorner(cell) \land \neg Below(cell, cell\_belowandright) \land \neg Right(cell, cell\_belowandright)$ $\Rightarrow IsData(cell\_belowandright)$ |
| 8 | $DataTransitionCorner(cell) \land Below(cell, cell\_aboveandright) \land \neg Right(cell, cell\_aboveandright)$ $\Rightarrow IsHeader(cell\_aboveandright)$ |
| 9 | $DataTransitionCorner(cell) \land \neg Below(cell, cell\_downandleft) \land Right(cell, cell\_downandleft)$ $\Rightarrow IsHeader(cell\_aboveandright)$ |
| 10 | $\neg Right(cell, cell2) \land \neg Left(cell, cell2) \Rightarrow SameCol(cell, cell2)$ |
| 11 | $\neg Above(cell, cell2) \land \neg below(cell, cell2) \Rightarrow SameRow(cell, cell2)$ |
| 12 | $\neg IsData(cell) \Rightarrow \neg DataTransitionCorner(cell)$ |
| 13 | $DataTransitionCorner(cell) \Rightarrow \neg DataTransitionCorner(cell2)$ |
| 14 | $IsData(cell) \Rightarrow \neg IsHeader(cell)$ |
| 15 | $IsHeader(cell) \Rightarrow \neg IsData(cell)$ |

Figure 9c

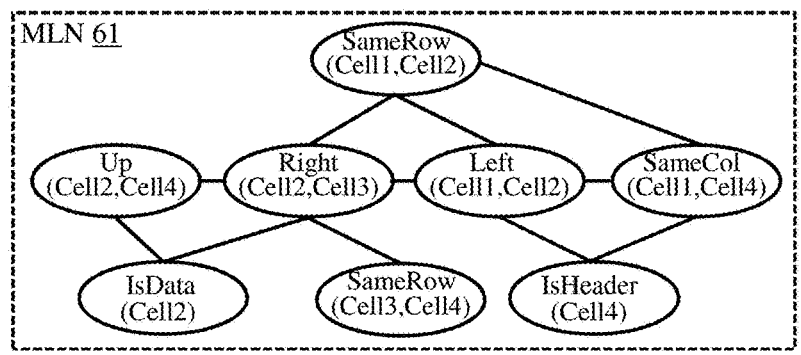

Figure 9d

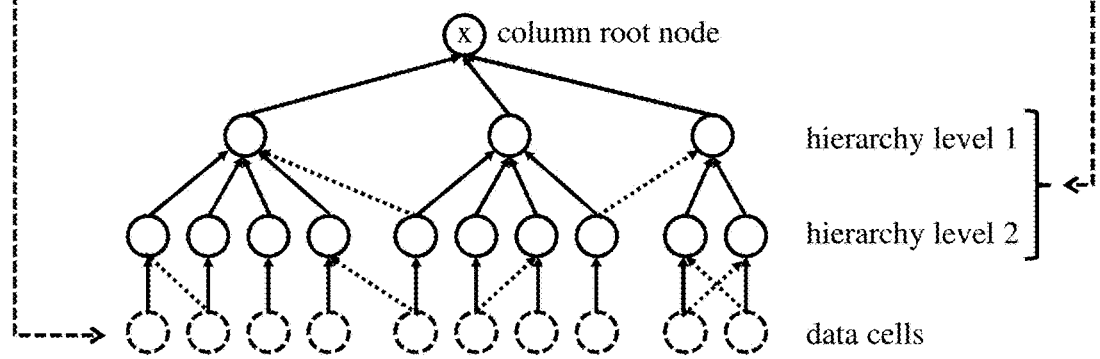
Figure 10a
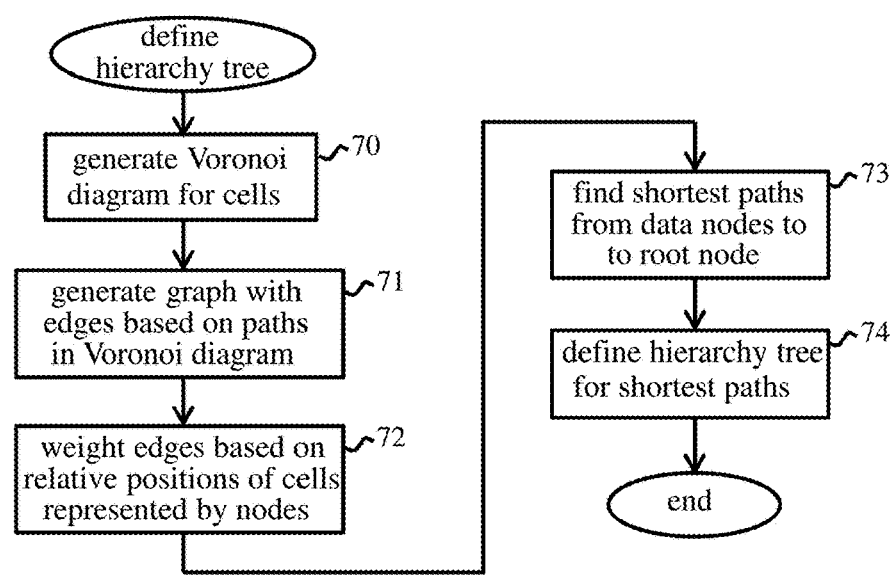
Figure 10b
Figure 11

| Statistic | Lead time (years) | | | | | | | | | |
|---|---|---|---|---|---|---|---|---|---|---|
| | 1 | 2 | 3 | 4 | 5 | 6 | 7 | 8 | 9 | 10 |
| Public elementary and secondary schools | | | | | | | | | | |
| Prekindergarten–12 enrollment | 0.3 | 0.6 | 0.8 | 1.1 | 1.3 | 1.4 | 1.6 | 1.9 | 2.3 | 2.8 |
| Prekindergarten–8 enrollment | 0.3 | 0.8 | 1.0 | 1.3 | 1.4 | 1.6 | 1.9 | 2.4 | 2.8 | 3.3 |
| 9–12 enrollment | 0.4 | 0.7 | 0.9 | 1.1 | 1.2 | 1.5 | 1.8 | 2.2 | 2.4 | 2.5 |
| High school graduates | 1.0 | 1.0 | 1.5 | 1.6 | 1.5 | 2.0 | 2.7 | 3.7 | 4.3 | 4.3 |
| Elementary and secondary teachers | 0.8 | 1.4 | 1.7 | 2.2 | 2.8 | 3.4 | 3.9 | 4.3 | 5.0 | 5.9 |
| Total current expenditures | 1.3 | 2.1 | 2.0 | 2.1 | 2.6 | 3.6 | 3.9 | 4.1 | 4.0 | 4.0 |
| Current expenditures per pupil in fall enrollment | 1.3 | 2.1 | 2.0 | 2.0 | 2.9 | 3.6 | 4.3 | 4.6 | 5.2 | 5.2 |
| Private elementary and secondary schools | | | | | | | | | | |
| Prekindergarten–12 enrollment | 3.4 | 4.6 | 3.7 | 7.2 | 7.7 | 10.8 | 9.3 | 9.4 | 8.1 | 6.3 |
| Prekindergarten–8 enrollment | 3.5 | 4.9 | 4.1 | 8.0 | 9.2 | 12.1 | 10.6 | 10.4 | 10.2 | 7.9 |
| 9–12 enrollment | 3.0 | 3.8 | 2.3 | 4.3 | 2.8 | 5.8 | 5.7 | 6.1 | 1.3 | 1.3 |
| High school graduates | 0.9 | 0.9 | 1.6 | 2.8 | 5.0 | 6.2 | 4.9 | 4.8 | 1.6 | 1.6 |
| Postsecondary degree-granting institutions | | | | | | | | | | |
| Total enrollment | 1.7 | 2.6 | 3.6 | 4.7 | 5.3 | 6.2 | 7.6 | 9.4 | 11.7 | 13.1 |
| Men | 1.7 | 3.0 | 4.2 | 5.5 | 6.3 | 7.0 | 8.1 | 9.8 | 11.7 | 13.3 |
| Women | 1.8 | 2.6 | 3.7 | 4.3 | 4.6 | 5.6 | 7.2 | 9.0 | 11.7 | 12.9 |
| 4-year institutions | 1.8 | 3.0 | 4.0 | 5.4 | 6.0 | 7.0 | 8.5 | 10.6 | 13.1 | 14.8 |
| 2-year institutions | 2.2 | 3.2 | 4.2 | 4.8 | 5.0 | 5.0 | 5.9 | 7.1 | 9.4 | 10.1 |

| | indent | bold | italic | all capital |
|---|---|---|---|---|
| level 1 | 0 | 1 | 0 | 0 |
| level 2 | 0 | 0 | 0 | 0 |
| level 3 | 1 | 0 | 0 | 0 |

Figure 14

| Year | Term | Mark | | | | | Grade |
|---|---|---|---|---|---|---|---|
| | | Assignments | | | Examinations | | |
| | | Ass1 | Ass2 | Ass3 | Midterm | Final | |
| 1991 | Winter | 85 | 80 | 75 | 60 | 75 | 75 |
| | Spring | 80 | 65 | 75 | 60 | 70 | 70 |
| | Fall | 80 | 85 | 75 | 55 | 80 | 75 |
| 1992 | Winter | 85 | 80 | 70 | 70 | 75 | 75 |
| | Spring | 80 | 80 | 70 | 70 | 75 | 75 |
| | Fall | 75 | 70 | 65 | 60 | 80 | 70 |

$$C = \{(Year, \{(1991), (1992)\}),$$
$$(Term, \{(Winter), (Spring), (Fall)\}),$$
$$(Mark, \{(Assignments, \{(Ass1), (Ass2), (Ass3)\}),$$
$$(Examinations, \{(Midterm), (Final)\})\}),$$
$$(Grade)\}\}$$

$$DataMap(\{Year.1991, Term.Winter, Mark.Assignments.Ass1\}) = 85$$
$$DataMap(\{Year.1992, Term.Fall, Mark.Grade\}) = 70$$

Figure 15

| | ICDAR | Synthetic |
|---|---|---|
| Precision(Header) | 0.900 | 0.939 |
| Recall(Header) | 0.921 | 0.913 |
| Precision(Data) | 0.969 | 0.967 |
| Recall(Data) | 0.959 | 0.977 |
| Accuracy | 0.948 | 0.960 |
| F1-Score | 0.910 | 0.926 |
| Images with 100% Accuracy | 50.0% | 66.4% |

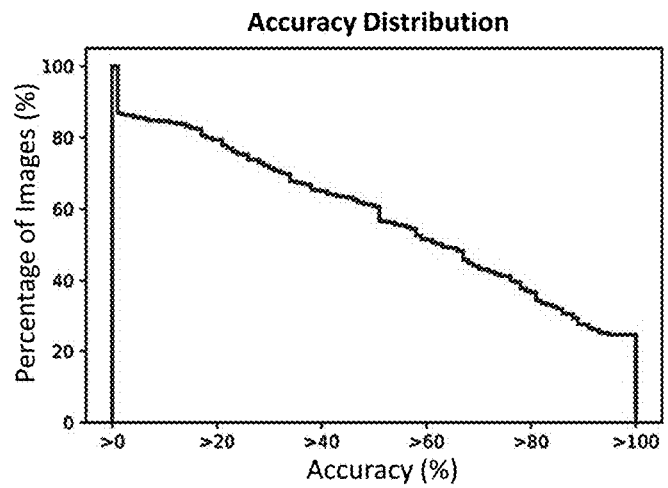

DATA STRUCTURE GENERATION FOR TABULAR INFORMATION IN SCANNED IMAGES

BACKGROUND

The present disclosure relates generally to data structure generation for tabular information in scanned images. Methods are provided for generating data structures representing such tabular information, together with apparatus and computer program products implementing such methods.

Scientific, medical and financial documents often depict structured information in the form of tables. Documents are frequently scanned for sharing and archiving purposes, and the resulting scanned (raster) images are stored for subsequent information retrieval. The structure of tables in scanned images is not easily readable by computer-based techniques. There is huge variability in the structure, complexity and visual representation of tables. Table headers, for example, can be structured in numerous ways to indicate correspondence between rows and columns of data and hierarchical headers. This variability poses a significant challenge for automated extraction of tabular information from scanned images.

SUMMARY

According to one aspect of the present invention there is provided a computer-implemented method for generating a data structure representing tabular information in a scanned image. The method includes storing image data representing a scanned image of a table, processing the image data to identify positions of characters and lines in the image, and mapping locations in the image of information cells, each containing a set of the characters, in dependence on said positions. The method includes, for each cell, determining cell attribute values, dependent on the cell locations, for a predefined set of cell attributes, and supplying the attribute values as inputs to a machine-learning model trained to pre-classify cells as header cells or data cells in dependence on cell attribute values. The method then applies predefined rules to the pre-classified cells to identify a corner data cell marking a transition between a region containing data cells and edge regions containing header cells in the image, and defines row and column header cells in dependence on location of cells in the edge regions. The method further comprises, for each of the set of row header cells and the set of column header cells, defining a hierarchy tree, indicating hierarchical structure of the header cells, in dependence on relative locations of those cells in the image, and using the hierarchy trees to generate a data structure mapping each data cell to corresponding row and column header cells in the hierarchical structure. The resulting data structure is stored to provide a queryable representation of the table.

A further aspect of the invention provides a computer program product comprising a computer readable storage medium embodying program instructions, executable by a computing apparatus, to cause the computing apparatus to perform a method for generating a data structure as described above.

An additional aspect of the invention provides a computing apparatus comprising memory for storing image data representing a scanned image of a table, and logic adapted to implement a method for generating a data structure as described above.

Embodiments of the invention will be described in more detail below, by way of illustrative and non-limiting example, with reference to the accompanying drawings.

BRIEF DESCRIPTION OF THE DRAWINGS

FIGS. 2a through 2g show examples of different table structures;

FIGS. 6a through 6c illustrate object detection steps in the FIG. 4 method;

FIGS. 7a through 7d illustrate a cell-detection step in the FIG. 4 method;

FIG. 8 illustrates a cell classification process in a preferred embodiment of the data structure generation method;

FIGS. 9a through 9d illustrate a cell analysis step in a preferred embodiment;

FIGS. 10a and 10b illustrate steps of a hierarchy extraction operation in the FIG. 4 method;

FIG. 11 indicates steps of a hierarchy extraction process in a preferred embodiment;

FIG. 14 shows another process used in hierarchy tree generation in preferred embodiments;

FIG. 15 illustrates a data structure generated by a method embodying the invention; and FIGS. 16 and 17 illustrate performance results obtained with methods embodying the invention.

DETAILED DESCRIPTION

Figure 1:
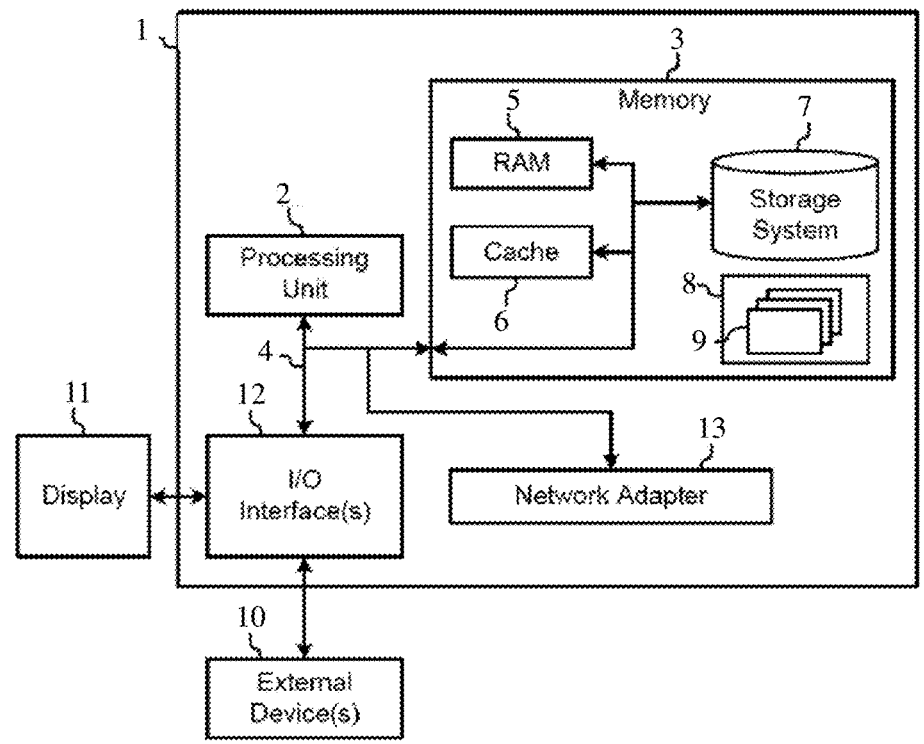
FIG. 1 is a schematic representation of a computing apparatus for implementing methods embodying the invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention provide computer-implemented methods for generating data structures representing tabular information in scanned images. Such methods may be implemented by computing apparatus comprising one or more general- or special-purpose computers, each of which may comprise one or more (real or virtual) machines, providing functionality for implementing operations described herein. Steps of methods embodying the invention may be implemented by program instructions, e.g. program modules, implemented by a processing device of the apparatus. Generally, program modules may include routines, programs, objects, components, logic, data structures, and so on that perform particular tasks or implement particular abstract data types. The computing apparatus may be implemented in a distributed computing environment, such as a cloud computing environment, where tasks are performed by remote processing devices that are linked through a communications network. In a distributed computing environment, program modules may be located in both local and remote computer system storage media including memory storage devices.

FIG. 1 is a block diagram of exemplary computing apparatus for implementing steps of methods embodying the invention. The computing apparatus is shown in the form of a general-purpose computer 1. The components of computer 1 may include processing apparatus such as one or more processors represented by processing unit 2, a system memory 3, and a bus 4 that couples various system components including system memory 3 to processing unit 2.

Bus 4 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer 1 typically includes a variety of computer readable media. Such media may be any available media that is accessible by computer 1 including volatile and non-volatile media, and removable and non-removable media. For example, system memory 3 can include computer readable media in the form of volatile memory, such as random access memory (RAM) 5 and/or cache memory 6. Computer 1 may further include other removable/non-removable, volatile/non-volatile computer system storage media. By way of example only, storage system 7 can be provided for reading from and writing to a non-removable, non-volatile magnetic medium (commonly called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can also be provided. In such instances, each can be connected to bus 4 by one or more data media interfaces.

Memory 3 may include at least one program product having one or more program modules that are configured to carry out functions of embodiments of the invention. By way of example, program/utility 8, having a set (at least one) of program modules 9, may be stored in memory 3, as well as an operating system, one or more application programs, other program modules, and program data. Each of the operating system, one or more application programs, other program modules, and program data, or some combination thereof, may include an implementation of a networking environment. Program modules 9 generally carry out the functions and/or methodologies of embodiments of the invention as described herein.

Computer 1 may also communicate with: one or more external devices 10 such as a keyboard, a pointing device, a display 11, etc.; one or more devices that enable a user to interact with computer 1; and/or any devices (e.g., network card, modem, etc.) that enable computer 1 to communicate with one or more other computing devices. Such communication can occur via Input/Output (I/O) interfaces 12. Also, computer 1 can communicate with one or more networks such as a local area network (LAN), a general wide area network (WAN), and/or a public network (e.g., the Internet) via network adapter 13. As depicted, network adapter 13 communicates with the other components of computer 1 via bus 4. It should be understood that although not shown, other hardware and/or software components could be used in conjunction with computer 1. Examples include, but are not limited to: microcode, device drivers, redundant processing units, external disk drive arrays, RAID systems, tape drives, and data archival storage systems, etc.

Embodiments to be described generate data structures representing information content of tables in scanned document images. There is huge variability in the way tabular information can be structured and presented in documents. Some examples are shown in FIGS. 2a through 2d. Row and column headers may have various structures, ranging from a simple structure shown in FIG. 2a (one row/column header per row/column of data), to complex hierarchical structures. FIG. 2b shows an example of hierarchical header structures with multiple sub-headings. FIG. 2c show another example with missing data rows and embedded sub-headers between data rows. In some cases, all table entries (header and data) may be delimited by lines as shown in FIG. 2d. In other cases, tables may have some lines (FIGS. 2e and 2f) or no lines at all (FIG. 2g). The range of possible table structures is highly diverse and presents a major challenge for automated extraction of useful data from scanned images.

Figure 3:
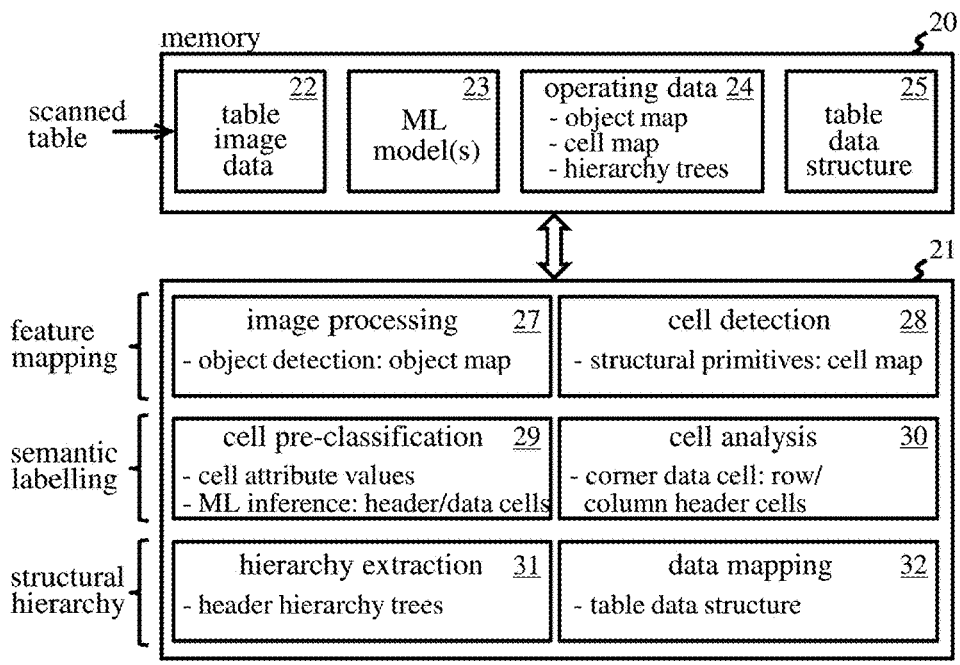
FIG. 3 is a schematic representation of component modules of a computing apparatus for implementing methods embodying the invention.

FIG. 3 is a schematic representation of component modules in an exemplary computing apparatus for implementing methods embodying the invention. The apparatus comprises memory 20 and processing logic indicated generally at 21. In operation, memory 20 stores image data 22 representing a scanned (raster) image of a table, and data defining one or more (pre-trained) machine-learning (ML) models as indicated at 23. Memory 20 also stores various operating data 24 which is generated during operation of the system. This includes an object map, a cell map, and hierarchy trees (all detailed below), along with associated metadata. Memory 20 also stores the resulting data structure 25 generated from image data 22. Processing logic 21 comprises an image processing module 27, a cell-detection module 28, a cell pre-classification module 29, a cell analysis module 30, a hierarchy extraction module 31 and a data mapping module 32.

Image processing module 27 comprises functionality for processing image data 22 to generate the object map which identifies positions of basic objects (characters and lines) in the image. Cell-detection module 28 comprises functionality for processing the object map to identify structural primitives and generate the cell map as detailed below. Modules 27 and 28 thus perform fundamental feature mapping operations for the image.

Cell pre-classification module 29 comprises functionality for determining cells attribute values used for inference by a ML model 23 to pre-classify cells as header cells or data cells. Cell analysis module 30 comprises functionality for identifying a corner data cell as detailed below and defining row and column header cells. Modules 29 and 30 thus perform semantic labelling/classification operations for cells in the image.

Modules 31 and 32 perform operations to identify the structural hierarchy of the table. In particular, hierarchy extraction module 31 comprises functionality for defining hierarchy trees for the hierarchical structures of row and column header cells. Data mapping module 32 generates the data structure 25 which maps data cells to their corresponding row and column header cells in the hierarchy.

In general, memory 20 may comprise one or more types of memory/storage components which, along with logic modules 27 through 32, may be provided in one or more computers of a computing system. All components may, for example, be provided in a general-purpose computer 1. Modules may be implemented, in general, by software (e.g., program modules 9), or hardware or a combination thereof. Functionality may be allocated differently between component modules in computing apparatus embodying the invention, and functionality of one or more modules may be combined.

Figure 4:
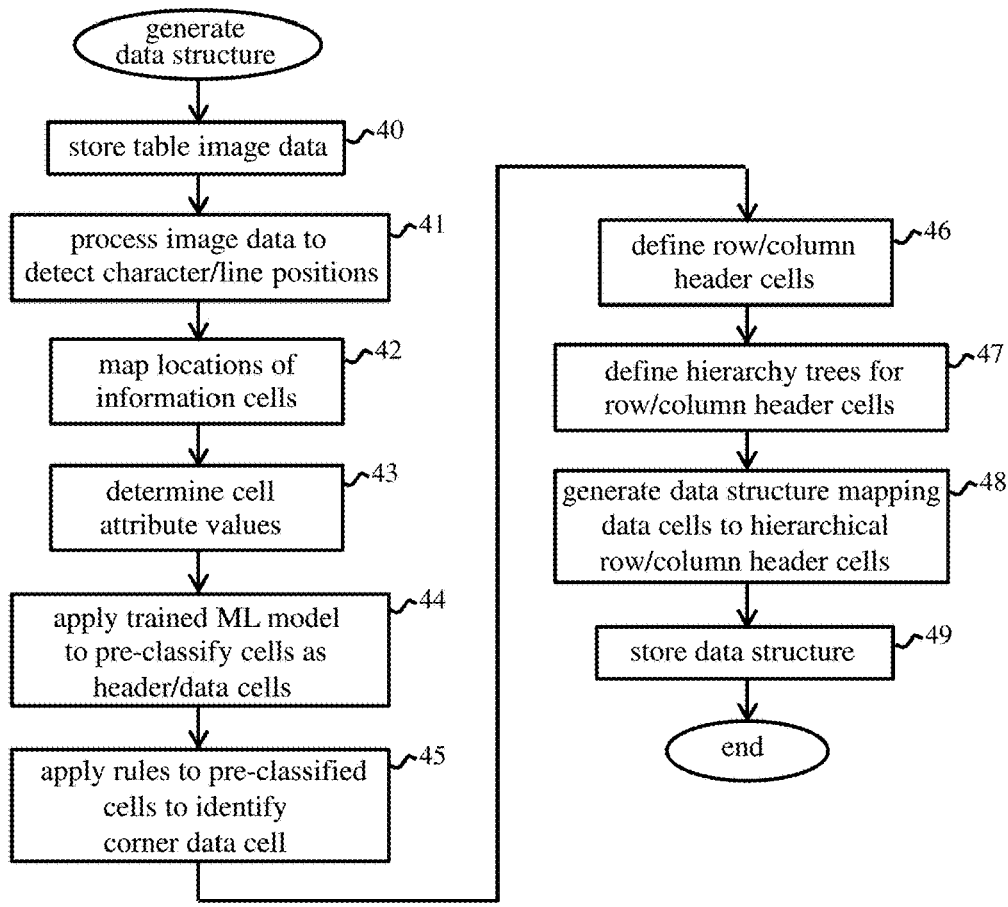
FIG. 4 indicates steps of a data structure generation method embodying the invention.

FIG. 4 indicates basic steps of a data structure generation method performed by the FIG. 3 apparatus. In step 40, the image data 22 representing a scanned image of a table is stored in memory 20. (Identifying and extracting portions of scanned documents which depict tables can be done in known manner, and the particular technique employed is orthogonal to the operation described herein). The image data represents a grid of pixels and can be represented in any convenient image format. In step 41, image processing module 27 processes the image data 22 to identify positions of characters and lines in the image. Module 27 thus detects these basic objects as detailed below, and generates the object map which identifies positions of the objects in the image. The object map is stored as operating data 24 in memory 20. In step 42, cell detection module 28 maps locations in the image of information cells in dependence on the detected positions of basic objects in the object map. Each information cell contains a set of characters, and more particularly a set of (one or more) character strings, as described further below. The resulting cell map is then stored in memory 20.

In step 43, cell pre-classification module 29 determines cell attribute values for cells in the cell map. The attribute values comprise values for a predefined set of cell attributes previously used to train a ML model 23 stored in memory 20. This ML model is trained to pre-classify cells as header cells or data cells in dependence on the cell attribute values. Cell attribute values are dependent (at least) on locations of cells in the cell map, and may include other attributes, e.g. relating to format of character strings, as detailed below. In step 44, module 29 supplies the cell attribute values as inputs to the pre-trained model to obtain soft labels which pre-classify individual cells as either header cells or data cells. These preliminary classification labels are stored as metadata in memory 20.

In step 45, cell analysis module 30 applies a set of predefined rules to the pre-classified cells to identify a corner data cell for the image. Preferred embodiments apply these rules in a probabilistic manner, as detailed below, to identify the corner data cell. The corner data cell marks a transition between a region containing data cells and edge regions containing header cells in the image. The location of the corner data cell is then used in step 46. Here, module 30 defines (labels) the row and column header cells for the image in dependence (at least) on location of cells in the edge regions as detailed below.

In step 47, the resulting sets of row header cells and column header cells are processed by hierarchy extraction module 31 to define a hierarchy tree for each set. These hierarchy trees indicate hierarchical structure of the (row or column) header cells. Each hierarchy tree is defined in dependence (at least) on relative locations of the row or column cells in the image as explained in detail below. The resulting hierarchy trees are then stored in memory 20. In step 48, data mapping module 32 uses the hierarchy trees to generate a data structure mapping each data cell to its corresponding row and column header cells in the hierarchical structure of each set of header cells. The resulting table data structure 25 is stored in memory 20 in step 49.

Figure 5:
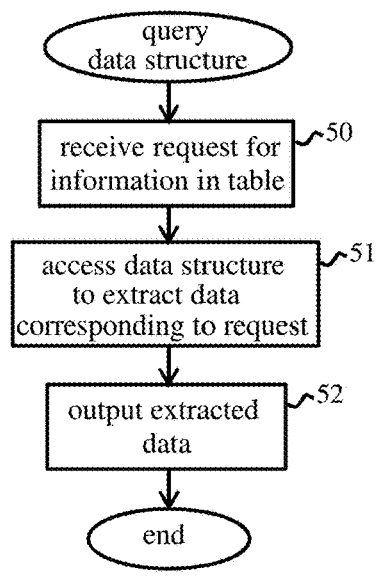
FIG. 5 indicates additional steps of a method embodying the invention.

The data structure 25 generated by the above method provides a queryable representation of the original table, and can be used for automated data extraction as indicated in FIG. 5. Step 50 here represents receipt by computer 1 of a request for information which was contained in the original table. Such a request may comprise a standard database query in any convenient format, and may identify data required from the table as a function of the headers, e.g. requesting all or specified subset of data corresponding to one or more specified headers. In response to receipt of a request, in step 51 computer 1 extracts data corresponding to the requested information from the data structure 25. The extracted data is then output in step 52 for return to the requester.

It can be seen that the FIG. 4 method uses a rule-based approach to identify the corner data cell based on pre-classification of header/data cells by an ML technique. Identification of the corner data cell provides an elegantly simple and efficient technique for determining the transition between headers and data in a table, and allows for multiple hierarchical levels of header cells which can then be defined via the hierarchy trees. By addressing hierarchical structure of headers in this way, methods embodying the invention can accommodate any type of table structure, offering an efficient, generic technique for automated extraction of tabular data from images.

Figures 6A, 6B, 6C:
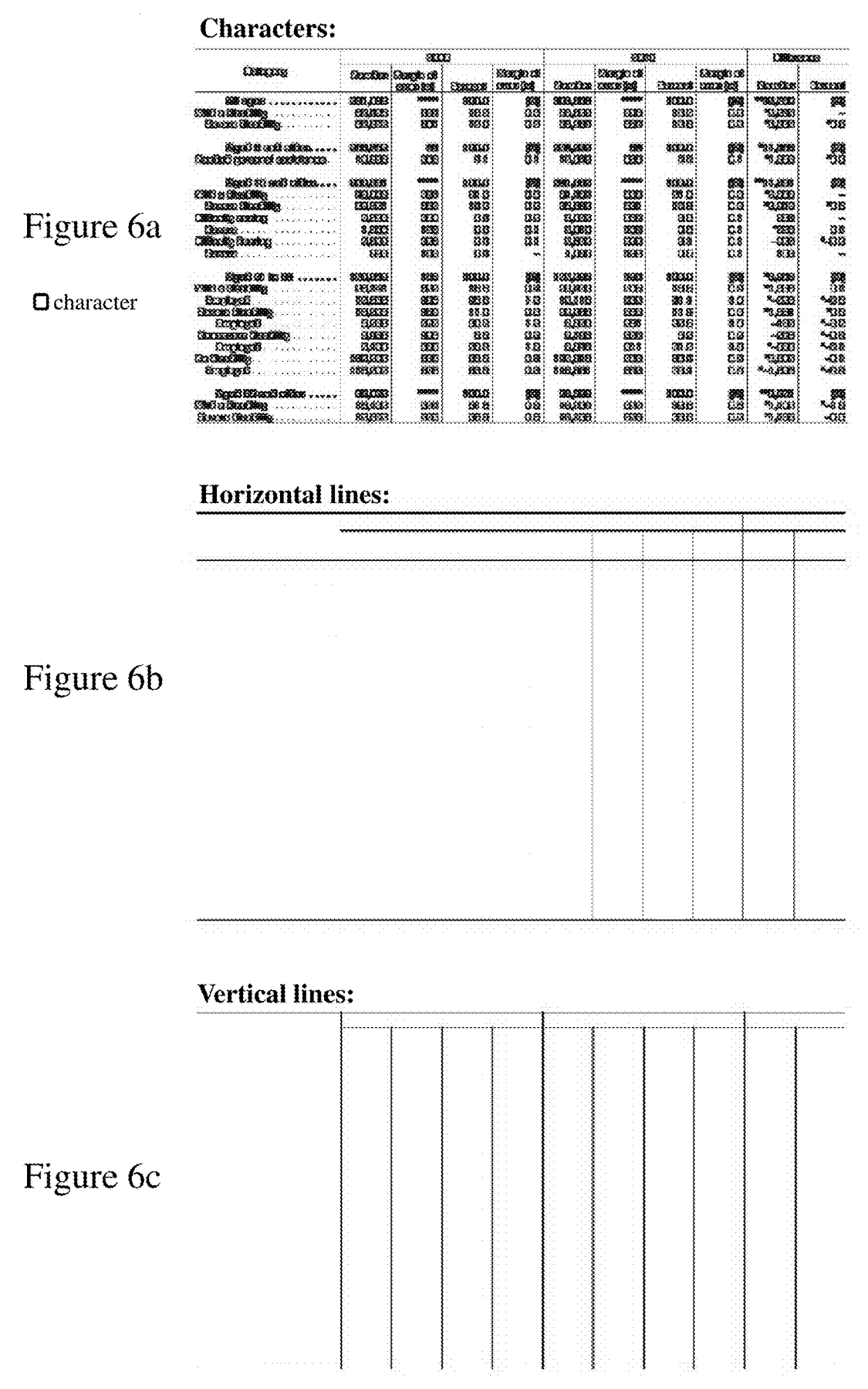

Exemplary implementations of the FIG. 4 method steps are described in more detail below. FIGS. 6a through 6c illustrate basic object detection operations in step 41. (Note that here and in other figures, legibility of text in tables is not required. All relevant structural information is apparent from the figures provided). FIG. 6a illustrates identification of individual characters, e.g. letters, numbers, punctuation marks and other symbols, which are marked by boxes in the figure. Detection of characters can be performed using well-known optical character recognition (OCR) techniques, including commercial systems such as the Tesseract OCR engine or other character recognition methods which are trained ad hoc for the data. Identification of horizontal and vertical lines in the image, as shown in bold in FIGS. 6b and 6c, can also be done using well-known techniques. Examples include Hough transform feature extraction and/or counting pixels in the bitmap image. Metadata defining positions of the detected characters/line segments is stored in the object map.

The cell location process (step 42 of FIG. 4) is illustrated in FIGS. 7a through 7c. Starting with the character map (FIG. 7a), horizontal morphological dilation is performed to identify character strings (strings of contiguous characters, separated by gaps) as illustrated in FIG. 7b. Further analysis is then performed to identify sets of (in general one or more) character strings which constitute individual information cells in the table. This process can exploit one or more: location of lines, where present, relative to character strings (e.g. to identify strings within closed rectangles or between horizontal/vertical line pairs); gap sizes between horizontally/vertically spaced strings; and vertical/horizontal alignment of different character strings in the map. The resulting cells are indicated by grey boxes in FIG. 7c. Cell definition can be provisional at this stage and may be refined later, e.g. during structural hierarchy analysis. For example, FIG. 7d illustrates a particular issue where some, "true" information cells in the table contain more than one vertically-offset character string (upper circle in the figure). It can be difficult to distinguish these from other parts of the table (e.g. the lower circle) where vertically-offset strings are not linked. To address this, preferred embodiments do not merge vertically-offset strings into cells. Each information cell thus contains a set of horizontally-aligned characters in the image.

In preferred embodiments, the semantic labeling process (steps 43 to 46 of FIG. 4) uses a Random Forest model for pre-classification of cells. The Random Forest (RF) technique is a well-known tree ensemble method whereby multiple decision trees are generated to model a training dataset. Briefly, a set of attributes is defined for assessing training examples. Corresponding "attribute values", indicating the type, quality, value or other expression of each attribute in a training example, are defined for all training examples. Each training example is also labeled according to the particular classification assigned to that example in a classification scheme. The RF technique then analyzes the training set to grow an ensemble of decision trees, which map input attribute values to classification labels, according to a stochastic optimization process. The trained model, comprising the resulting tree ensemble, can then be applied for inference. Attribute values for a new (unseen) input example are supplied to the tree ensemble. Each tree outputs a corresponding classification, and the most frequent (mode) result is output as the classification for the input example.

In the present application, a synthetic dataset of 10,000 tables, with many varied structures, was used to train an RF model. The attribute set comprised a plurality of attributes dependent on location of cells in the image. These attributes were selected from: number of neighboring cells; number of neighboring cells to the right; number of neighboring cells to the left; number of neighboring cells above; number of neighboring cells below; having a line on the right; having a line on the left; having a line above; having a line below; and the area occupied by the cell. In preferred embodiments, the attribute set also included a subset of attributes dependent on character strings in cells. These attributes were selected from: characters are bold; characters are italic; proportion (e.g. %) of numeric characters; proportion of alphabetic characters; and proportion of non-alphanumeric characters (special characters, symbols, etc.). RF models were generated with varying attribute sets and numbers of decision trees, and the models were then evaluated for inference performance. Optimum RF model parameters were then identified, and the final RF model was generated with these parameters. This model contained 300 trees and used the following set of attributes: number of neighboring cells; cell type (proportion of numeric, alphabetic and non-alphanumeric characters); characters are bold; characters are italic; number of neighboring cells to the right; number of neighboring cells above; having a line on the right; having a line on the left; having a line above; having a line below; and area occupied by the cell.

FIG. 8 illustrates the semantic labelling process in this embodiment. Pre-classification module 29 determines attribute values, corresponding to each of the above attributes, for all cells in the cell map. The attribute values for each cell are input to the trained RF model, indicated at 60, to obtain a soft label pre-classifying the cell as a header or data cell. The soft labels are supplied to cell analysis module 30 which implements a Markov logic network 61, described further below, to identify the corner data cell. All cells are then classified as either a row header cell, a column header cell, or a data cell.

The Markov logic network 61 is stored as a ML model in memory 20 of FIG. 3. Markov logic networks (MLNs) are well-known network models for representing a collection of formulas/rules, expressed in first order logic, which are assigned respective weights. Formulas/rules are expressed in terms of constants, representing objects in the domain of interest, and predicates which represent attributes of, or relationships between, objects. A Markov logic network induces a probabilistic graph (Markov random field) for the data on which it is applied. Nodes of a graph represent predicates, and edges linking nodes represent the logical connections used to construct the formulas/rules. Probabilities P are associated with nodes such that P=1 if the node is true and P=0 if the node is false. The probabilities are combined with the rule weights to indicate the likelihood that a rule holds. The rule weights are learned in a training phase in which the network is exposed to training data and the weights are learned via an optimization process. The resulting trained network can then be applied for inference to determine conditional probabilities based on known probabilities for input data.

In the present application, MLN model 61 represents a set of rules defined over predicates relating to cells. Predicates used in this embodiment are shown in FIG. 9a. In the inference operation, probabilities (continuous numerical values between 0 and 1 where 0 means false and 1 means true) are assigned to predicates based on the soft pre-classification labels and relative locations of cells in the cell map. As indicated by the "Query" in FIG. 9a, the inference operation involves finding the corner data cell (CDC) for the table. As illustrated in FIG. 9b for a simple table, the CDC marks the transition between a region of the image which contains data cells and edge regions which contain (row and column) header cells. (While a simple table is shown here, tables may contain additional header cells, outside the edge regions, such as column headers embedded in the data cell region).

FIG. 9c show the rules used in this embodiment. Here: the symbol $\wedge$ denotes logical AND; $\neg$ denotes NOT; and $\Rightarrow$ denotes "implies". Rules are defined in the network by connecting nodes, representing the constituent predicates, via edges according to the combinations of predicates expressed by the rules. An illustrative example of a portion of the resulting MLN 61 is shown in FIG. 9d. Rule weights are learned in the network training phase and indicate the importance of respective rules for identification of the CDC. During inference, the rules are applied to the pre-classified cells by applying the MLN, with probabilities P assigned to predicates for each cell, to determine the most probable CDC for the table. In particular, the MLN will identify the cell associated with the lowest "rule-breaking cost" for the network. Some rules will generally be broken for all cells, and a higher cost is associated with higher rule weights, whereby the cell associated with the minimum total cost is the most likely CDC.

Cell analysis module 30 uses the location of the CDC to identify the sets of row and column header cells. In particular, header cells located above the CDC are labeled as column header cells. All other header cells to the left of the CDC are labeled as row header cells. Any other pre-classified header cells below the CDC, (i.e. embedded in the data region) are labelled as column header cells.

The resulting sets of row and column header cells are processed by hierarchy extraction module 31 to generate the hierarchy tree for each set. This process may be performed in different ways depending on particular header features, present in some tables, which can be identified by module 31 as discussed further below. In general, however, the hierarchy tree is generated by a weighted graph technique for at least one of the sets of row and column header cells, typically at least the column headers. In this process, module 31 generates a weighted graph comprising nodes which represent the header cells, their neighboring data cells and a predefined root cell in the image. The root cell is a notional cell at a defined reference location in the image. This is illustrated in FIG. 10a for column headers in an exemplary table. Here the root cell location x is defined at a mid-position above the column headers in the image. Nodes for the root cell, the header cells, and their neighboring data cells (i.e. the first row of data cells in FIG. 10a), are interconnected by edges in the graph. In particular, each node is connected to (at least) a set of other nodes representing its neighboring cells in the image. The network graph for FIG. 10a header cells (with only a subset of edges shown for clarity) is illustrated in FIG. 10b. The edge between each pair of nodes is assigned a weight (not shown in the figure) which is dependent on relative position in the image of the cells represented by those nodes. Higher weights correspond to greater distance between cells. Module 31 then selects the optimal path through the graph between each node representing a data cell and the node representing the root cell. The optimal path is that with the lowest cumulative weight. These optimal paths, indicated by solid arrows in FIG. 10b, define the branches of the hierarchy tree. The resulting tree indicates hierarchical structure of the column header cells, with each header cell lying at a particular hierarchy level, here level 1 or level 2, according to the number of edges between it and the root node (level 0).

Figure 12:
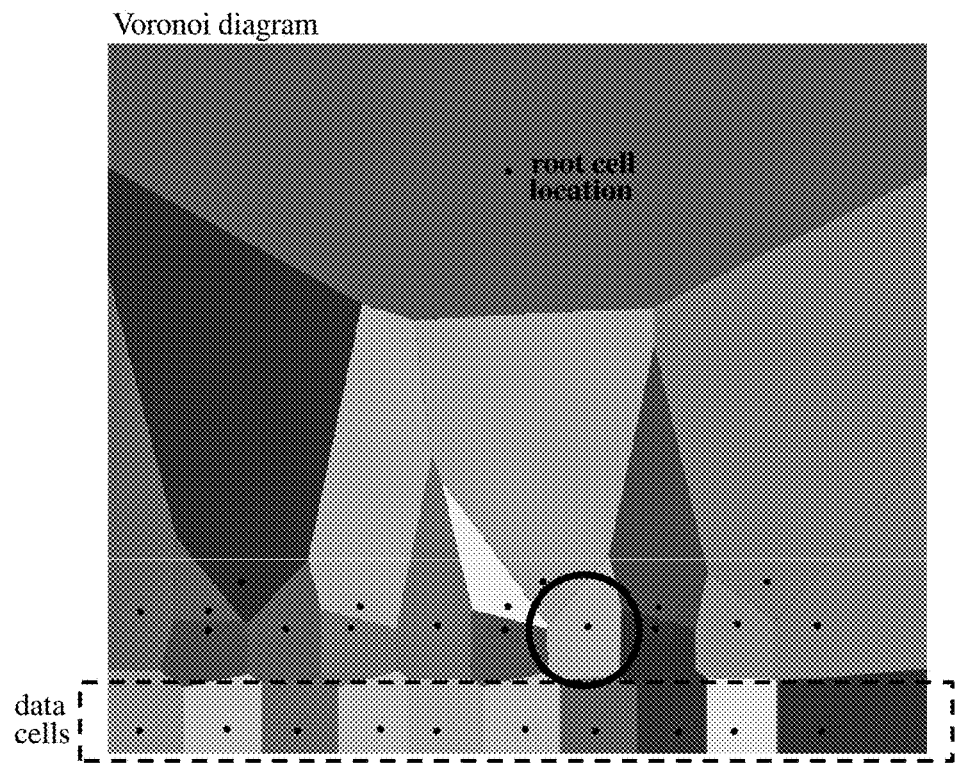
FIG. 12 illustrates construction of a Voronoi diagram for an exemplary column header structure in the FIG. 11 process.

FIG. 11 indicates steps of the tree generation process in a preferred embodiment. In step 70, module 31 defines a Voronoi diagram for locations in the image of the header cells, their neighboring data cells and the root cell. The Voronoi diagram is illustrated in FIG. 12 for the column headers of FIG. 10a. Each region of this diagram corresponds to a cell and contains all points in the image which are closer to the location of that cell than any other cell location. The ringed region, for example, corresponds to the ringed cell in FIG. 10a. In step 71, the weighted graph is then generated with edges determined by paths in the Voronoi diagram between regions corresponding to each data cell location, through neighboring regions, towards the root cell location. This process reduces the number of edges in the graph to a minimal subset from which the optimal paths can be determined more efficiently. In step 72, the edges are weighted according to a cost function:

$$w(a,b)=\beta_1 \sin(a,b)+\beta_2|a_y-b_y|^2$$

where: w(a, b) is the weight of an edge between a node a and node b; $a_y-b_y$ is the relative vertical displacement of the nodes a and b; and $\beta_1$ and $\beta_2$ are constants. In step 73, the Dijkstra shortest paths between data nodes and the root node are then computed based on the edge weights. The hierarchy tree is then defined with branches corresponding to the shortest paths in step 74.

Note that header cells embedded in the data region of an image can be readily accommodated in the above process. Also, referring back to FIG. 7d, construction of the hierarchy tree can lead to merging of vertically-offset header cells where appropriate. In particular, if a branch of the hierarchy tree contains more nodes than others, nodes can be merged until the branches contain one node in each hierarchy level.

Figure 13:
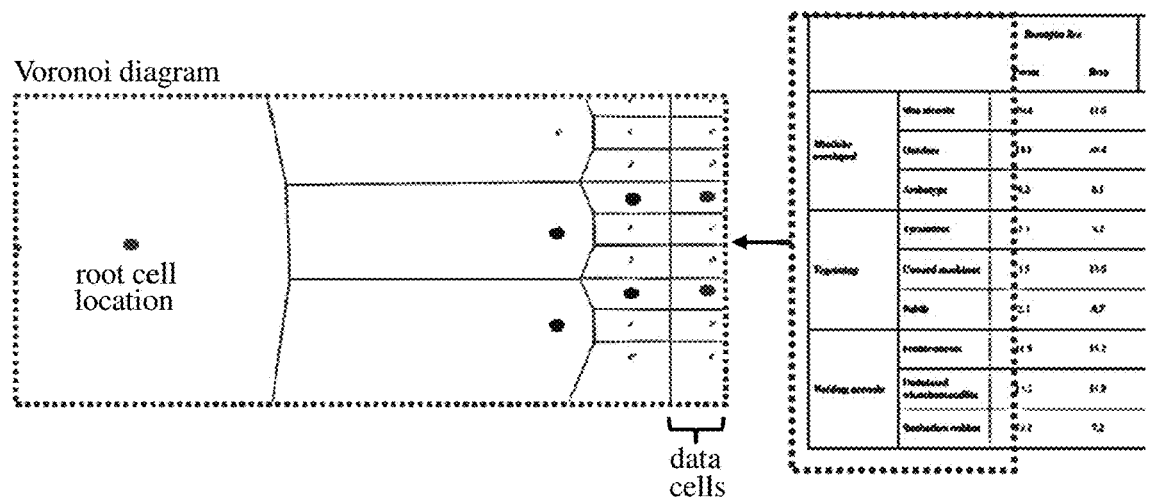
FIG. 13 illustrates a similar process for an exemplary row header structure.

The above process may be performed for both row and column header sets. FIG. 13 illustrates the Voronoi diagram for an exemplary row header structure. Here, however the cost function used to weight edges is defined by:

$$w(a,b)=\beta_1 \cos(a,b)+\beta_2|a_x-b_x|^2$$

where $a_x-b_x$ is the relative horizontal displacement of nodes a and b. However, some tables may contain headers with particular format properties which can be used to simplify or assist hierarchy tree construction. For example, module 31 may determine if each cell in the set has any of a predetermined set of format properties. This set of format properties may comprise one or more of: bold text; italic text; indented text and upper-case (capital) text. If the set includes cells with differing format properties (as may be employed to indicate hierarchy structure in headers), module 31 may then define the hierarchy tree (wholly or partially) in dependence on the format properties of the cells. FIG. 14 illustrates a particular example of this process for row headers in a table. Here the header hierarchy is indicated by cell location, bold type and indents. Module 31 assigns property values 0 or 1 to each header cell for the properties "indent", "bold", "italic" and "all capital" according to the presence (1) or absence (0) of these cell properties as indicated in the table in the figure. Cells are then labeled as hierarchy level 1, 2 or 3 as indicated based on which row of the table defines their attribute values. The row hierarchy tree is then constructed accordingly.

Hierarchy tree construction may exploit one or a combination of the above processes. For example, some tables may have multiple columns of row headers with hierarchy of headers in some columns being indicated by formatting while others have no formatting differences. The FIG. 14 method may be applied to determine portions of the hierarchy tree corresponding to the formatted header cells, with the graphical method applied for the remainder of the tree.

Data mapping module 32 uses the resulting hierarchy tree to map data cells in rows and columns to their corresponding header cells in the row and column hierarchy trees. In this embodiment, a table T is defined by an ordered pair (C, Data Map) where C is the set of row and column headers and Data Map is the map from the hierarchy of C to the data items in cells. FIG. 15 shows the resulting data structure T for an exemplary table.

The preferred embodiment described above can provide an exceptionally efficient, generic process for generating queryable data structures for tables. The process accommodates multiple hierarchy levels in rows and columns, and can detect structure without relying solely on presence of lines or assuming any particular table format. The MLN approach allows efficient, probabilistic application of reasoning-based rules for CDC detection, with input data for inference driving the cost of breaking rules for an optimal solution. Performance was evaluated against the ICDAR (International Conference on Document Analysis and Recognition) 2013 dataset consisting of 124 images of tables. 97.2% of all cells were correctly detected, and 93.8 of detected cells were present in the original tables. Cell content was assessed on the basis of number of deletions, substitutions and insertions required to convert one string to another, achieving an accuracy of 85.4%. Semantic labeling (modules 29 and 30 of FIG. 3) was evaluated for both ICDAR and synthetic datasets, and the analyzed results are presented in FIG. 16. Here, "precision" indicates the ratio of correctly-detected header/data sets; "recall" indicates the ratio of detected header/data cells in the correct (ground truth) set; "accuracy" indicates overall accuracy; and "F1 score" indicates a combination of "precision" and "recall" to reflect both aspects in a single metric. FIG. 17 illustrates the accuracy distribution for extracted data (query results) from data structures generated for 1000 images of a synthetic dataset. A strict metric of data accuracy=1 if both row and column hierarchies were correct, and data accuracy=0 otherwise, was applied. The results with this harsh accuracy criterion are highly impressive.

It will be appreciated that various changes and modifications can be made to the exemplary embodiments described above. By way of example, other machine learning models, such as neural networks or support vector machine models, may be employed for pre-classification of cells. While MLN models are preferred for CDC detection, other rule-based systems, e.g. fixed rule-sets or Bayesian networks/other probabilistic graph models, could be employed. Fully-connected graphs could be used as a basis for hierarchy tree generation in some embodiments. Data structures other than the ordered pair described above can of course be used for table representation.

In general, where features are described herein with reference to a method embodying the invention, corresponding features may be provided in a computing apparatus/computer program product embodying the invention, and vice versa.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for generating a data structure representing tabular information in a scanned image, the method comprising:
   storing image data representing a scanned image of a table;
   processing the image data to identify positions of characters and lines in the image;
   mapping locations in the image of information cells, each containing a set of said characters, in dependence on said positions;
   for each cell, determining cell attribute values, dependent on said locations, for a predefined set of cell attributes and supplying the attribute values as inputs to a machine-learning model trained to pre-classify cells as header cells or data cells in dependence on cell attribute values;
   applying predefined rules to the pre-classified cells to identify a corner data cell marking a transition between a region containing data cells and edge regions containing header cells in the image, and defining row and column header cells in dependence on location of cells in said edge regions;
   for each of the set of row header cells and the set of column header cells, defining a hierarchy tree, indicating hierarchical structure of the header cells, in dependence on relative locations of those cells in the image;
   using the hierarchy trees to generate a data structure mapping each data cell to corresponding row and column header cells in said hierarchical structure; and
   storing the data structure to provide a queryable representation of said table.

2. A method as claimed in claim 1 including, in response to receipt, after storing said data structure, of a request for information in said table:
   extracting data corresponding to the requested information from the data structure; and
   outputting the extracted data.

3. A method as claimed in claim 1 wherein:
   said rules are defined, over predicates relating to cells, by a Markov logic network with pre-trained rule weights indicating importance of respective rules for identification of a corner data cell; and
   the step of applying said rules comprises applying the Markov logic network to the pre-classified cells to identify said corner data cell.

4. A method as claimed in claim 1 including, for at least one of the sets of row and column header cells, defining said hierarchy tree by:
   generating a weighted graph comprising nodes which represent the header cells, their neighboring data cells and a predefined root cell in the image, the node for each cell being interconnected by edges to at least a set of said nodes representing neighboring cells in the image, wherein the edge between each pair of nodes has a weight dependent on relative position in the image of the cells represented by those nodes; and
   selecting an optimal path, dependent on said weights, between each node representing a data cell and the node representing said root cell to define branches of the hierarchy tree.

5. A method as claimed in claim 4 including:
   defining a Voronoi diagram for locations in the image of the header cells, said neighboring data cells and said root cell; and
   generating the weighted graph with edges determined by paths in the Voronoi diagram between each data cell location and the root cell location.

6. A method as claimed in claim 1 including, for at least one of the sets of row and column header cells:
   determining if each cell has any of a predetermined set of format properties; and
   if the set of header cells includes cells with differing format properties, defining said hierarchy tree in dependence on the format properties of the cells.

7. A method as claimed in claim 6 wherein said set of format properties comprises at least one of bold text, italic text, indented text and upper-case text.

8. A method as claimed in claim 1 wherein said predefined set of cell attributes comprises a plurality of attributes selected from: number of neighboring cells; number of neighboring cells to the right; number of neighboring cells above; having a line on the right; having a line on the left; having a line above; having a line below; and the area occupied by the cell.

9. A method as claimed in claim 8 wherein said set of cell attributes includes a subset of attributes, dependent on character strings in cells, selected from: characters are bold; characters are italic; proportion of numeric characters; proportion of alphabetic characters; and proportion of non-alphanumeric characters.

10. A method as claimed in claim 1 wherein said machine-learning model comprises a Random Forest model.

11. A method as claimed in claim 1 wherein, in the step of mapping location of information cells, each information cell contains a set of horizontally-aligned characters in the image.

12. A computer program product for generating a data structure representing tabular information in a scanned image, said computer program product comprising a non-transitory computer readable storage medium having program instructions embodied therein, the program instructions being executable by a computing apparatus to cause the computing apparatus to:
   store image data representing a scanned image of a table;
   process the image data to identify positions of characters and lines in the image;
   map locations in the image of information cells, each containing a set of said characters, in dependence on said positions;
   for each cell, determine cell attribute values, dependent on said locations, for a predefined set of cell attributes and supply the attribute values as inputs to a machine-learning model trained to pre-classify cells as header cells or data cells in dependence on cell attribute values;

apply predefined rules to the pre-classified cells to identify a corner data cell marking a transition between a region containing data cells and edge regions containing header cells in the image, and define row and column header cells in dependence on location of cells in said edge regions;

for each of the set of row header cells and the set of column header cells, define a hierarchy tree, indicating hierarchical structure of the header cells, in dependence on relative locations of those cells in the image;

use the hierarchy trees to generate a data structure mapping each data cell to corresponding row and column header cells in said hierarchical structure; and store the data structure to provide a queryable representation of said table.

13. A computer program product as claimed in claim 12, said program instructions being further executable, in response to receipt, after storing said data structure, of a request for information in said table, to cause the computing apparatus to:

extract data corresponding to the requested information from the data structure; and output the extracted data.

14. A computer program product as claimed in claim 12, said program instructions being executable such that:

said rules are defined, over predicates relating to cells, by a Markov logic network with pre-trained rule weights indicating importance of respective rules for identification of a corner data cell; and the step of applying said rules comprises applying the Markov logic network to the pre-classified cells to identify said corner data cell.

15. A computer program product as claimed in claim 12, said program instructions being executable to cause the computing apparatus to define said hierarchy tree, for at least one of the sets of row and column header cells, by:

generating a weighted graph comprising nodes which represent the header cells, their neighboring data cells and a predefined root cell in the image, the node for each cell being interconnected by edges to at least a set of said nodes representing neighboring cells in the image, wherein the edge between each pair of nodes has a weight dependent on relative position in the image of the cells represented by those nodes; and selecting an optimal path, dependent on said weights, between each node representing a data cell and the node representing said root cell to define branches of the hierarchy tree.

16. A computer program product as claimed in claim 15, said program instructions being executable to cause the computing apparatus to:

define a Voronoi diagram for locations in the image of the header cells, said neighboring data cells and said root cell; and generate the weighted graph with edges determined by paths in the Voronoi diagram between each data cell location and the root cell location.

17. A computer program product as claimed in claim 12, said program instructions being executable to cause the computing apparatus to define said hierarchy tree, for at least one of the sets of row and column header cells, by:

determining if each cell has any of a predetermined set of format properties; and if the set of header cells includes cells with differing format properties, defining said hierarchy tree in dependence on the format properties of the cells.

18. A computer program product as claimed in claim 12, said program instructions being executable such that:

said predefined set of cell attributes comprises a plurality of attributes selected from: number of neighboring cells; number of neighboring cells to the right; number of neighboring cells above; having a line on the right; having a line on the left; having a line above; having a line below; and the area occupied by the cell; and the set of cell attributes includes a subset of attributes, dependent on character strings in cells, selected from: characters are bold; characters are italic; proportion of numeric characters; proportion of alphabetic characters; and proportion of non-alphanumeric characters.

19. A computer program product as claimed in claim 12, said program instructions being executable such that said machine-learning model comprises a Random Forest model.

20. An apparatus for generating a data structure representing tabular information in a scanned image, the apparatus comprising:

a non-transitory computer-readable medium for storing image data representing a scanned image of a table;

image processing logic adapted to process the image data to identify positions of characters and lines in the image;

cell-detection logic adapted to map locations in the image of information cells, each containing a set of said characters, in dependence on said positions;

cell pre-classification logic adapted, for each cell, to determine cell attribute values, dependent on said locations, for a predefined set of cell attributes and to supply the attribute values as inputs to a machine-learning model trained to pre-classify cells as header cells or data cells in dependence on cell attribute values;

cell analysis logic adapted to apply predefined rules to the pre-classified cells to identify a corner data cell marking a transition between a region containing data cells and edge regions containing header cells in the image, and to define row and column header cells in dependence on location of cells in said edge regions;

hierarchy extraction logic adapted, for each of the set of row header cells and the set of column header cells, to define a hierarchy tree, indicating hierarchical structure of the header cells, in dependence on relative locations of those cells in the image;

data mapping logic adapted to use the hierarchy trees to generate a data structure mapping each data cell to corresponding row and column header cells in said hierarchical structure, and to store the data structure in said computer readable medium to provide a queryable representation of said table.

\* \* \* \* \*